M. NADAL Y FELIP.
ATTACHMENT OF SPRINGS TO THE AXLES OF VEHICLES.
APPLICATION FILED DEC. 10, 1918.

1,370,901.

Patented Mar. 8, 1921.

INVENTOR
M. Nadal y Felip.
BY H. R. Kerslake
ATTORNEY

UNITED STATES PATENT OFFICE.

MERCEDES NADAL y FELIP, OF BARCELONA, SPAIN.

ATTACHMENT OF SPRINGS TO THE AXLES OF VEHICLES.

1,370,901.	Specification of Letters Patent.	Patented Mar. 8, 1921.

Application filed December 10, 1918. Serial No. 266,082.

*To all whom it may concern:*

Be it known that I, MERCEDES NADAL Y FELIP, a subject of the King of Spain, residing at No. 29 Calle de Claris, Barcelona, Spain, have invented certain new and useful Improvements in the Attachment of Springs to the Axles of Vehicles, of which the following is a specification.

This invention relates to the attachment of axles of automobiles or other vehicles to their springs, of the type in which the axle is capable of rotation about the spring, whereby to diminish the torsional stresses or transverse deformations liable to be induced in the spring when the axle is inclined out of its normal horizontal position as when one wheel meets with an obstuction or gets into a hole in the road.

Attachments of this kind heretofore known, comprise means whereby spring engaging parts mounted on the axle are adapted simply to rotate about the spring, but this construction does not suffice completely to avoid torsional stresses and transverse deformations in the spring due to the axle being inclined out of its normal horizontal position, because when the axle is thus inclined, the horizontal distance between the portions of the spring attached to the axle is decreased and the springs are deformed transversely and accordingly subjected to torsional stresses.

The object of the present invention is to provide an attachment of the type described, whereby the axles are allowed to move out of their horizontal positions owing to the effect of shocks, jerks or jolts experienced when traveling over uneven ground, deep holes and stones, without the slightest transverse deformation of the springs or torsional stresses therein.

According to the present invention, one spring is connected to the axle so as to permit of rotary movement of the axle about the spring and the other spring is connected to the axle so as to permit rotary movement of the axle about the spring and also relative movement between the spring and the axle, longitudinally of the axle.

In the accompanying drawings, which illustrate a constructional example of the improved spring attachments according to the present invention:—

Figure 1:
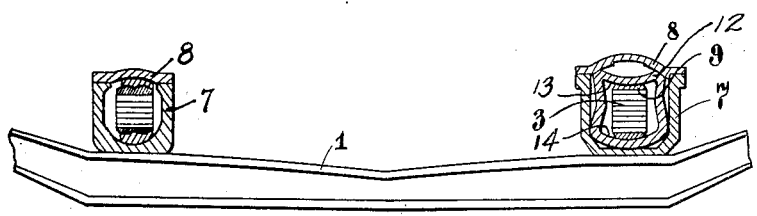
Figure 1 is an elevation of an axle, with the springs and spring attachments shown in cross-section.
Figure 2:
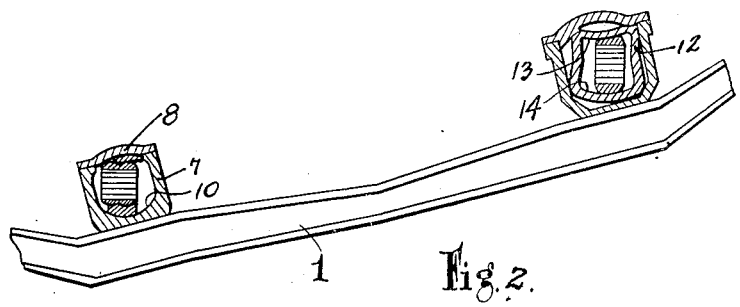
Figs. 2 and 3 are similar views of the axle in positions inclined from the normal.
Figure 3:
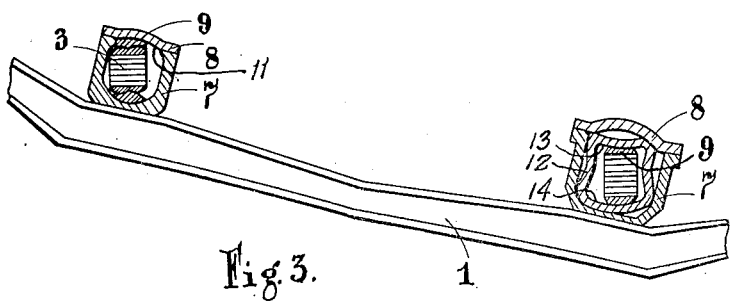

The spring attachment shown on the left-hand side in the drawings comprises a hollow member 7, U-shaped in cross section, fixed directly to the car axle 1 and provided with a cover 8. The member 7 is open at both ends to allow the spring 3 to pass through. The hollow member 7 and its lid 8 are provided with curved surfaces 10 and 11 which are cylindrical in form. The spring 3 is clamped in an armature 9 which is provided with correspondingly curved surfaces.

The spring attachment shown on the right-hand side of the drawings is modified so as to allow not only rotary movement of the hollow member 7 about the spring 3, but also to allow the spring to move relatively to the axis and longitudinally of the same. This result is attained by interposing a hollow member 12 between the spring and the hollow member 7. The hollow member 12 is provided on its exterior with bearing surfaces which are adapted to contact with the bearing surfaces of the hollow member 7 and its lid 8 so as to permit simple rotational movement between the two members 7 and 12. The member 12, in its interior is provided with bearing surfaces 13 and 14 which are adapted to engage with the bearing surfaces of the spring armature 9.

The bearing surfaces 13 and 14, in effect define a slot which allows movement of the spring longitudinally of the axle. The surfaces 13 and 14 may be either plane or curved.

It will thus be seen that when the axle is unevenly displaced with respect to the vehicle, no torsional stresses are induced in the springs for not only are the attachments pivotal in character but one spring is adapted to move longitudinally of the axle. The springs, therefore, under all conditions maintain themselves in their normal planes and suffer deformation only in these planes. This effect is clearly shown by the three views shown in the drawing.

Having now described my invention what I claim as new and desire to secure by Letters Patent is:—

1. In combination, an axle of an automobile or other vehicle, a pair of springs, means connecting the axle to one spring so as to permit rotary movement of the axle about the spring and means connecting the axle to the other spring so as to permit rotary movement of the axle about the spring and also relative movement between the spring and the axle longitudinally of the latter.

2. In combination, an axle of an automobile or other vehicle, a pair of springs, means mounted on the axle embracing one spring, and rotatable about the spring in the vertical plane passing through the axle, a member embracing the other spring, means mounted on the axle embracing the said member and rotatable about the same, the said member having a slot in which the spring is free to move longitudinally of the axle.

3. In combination, an axle of an automobile or other vehicle, a hollow member mounted on the axle with internal cylindrical bearing surfaces, a suspension spring located within said hollow member and carrying corresponding bearing surfaces for engagement therewith, a second hollow member mounted on the axle with internal cylindrical bearing surfaces, a third hollow member located within the second hollow member, and provided with corresponding bearing surfaces for engagement therewith, the third hollow member having internal bearing surfaces, and a second suspension spring located within the third hollow member and provided with bearing surfaces to engage therewith to allow the third hollow member to move with respect to the spring longitudinally of the axle.

In testimony whereof I have signed my name to this specification.

MERCEDES NADAL y FELIP.